G. E. HESELTON.
ADJUSTABLE BEARING.
APPLICATION FILED NOV. 17, 1911.
1,058,304.
Patented Apr. 8, 1913.
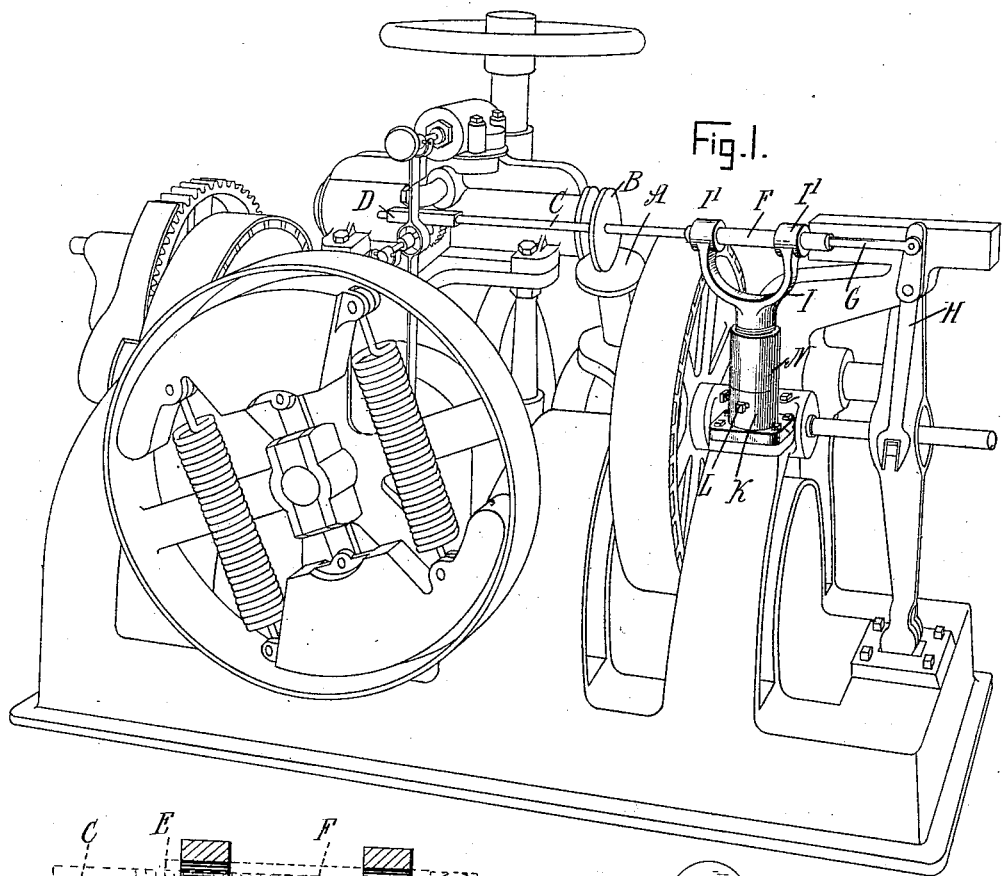
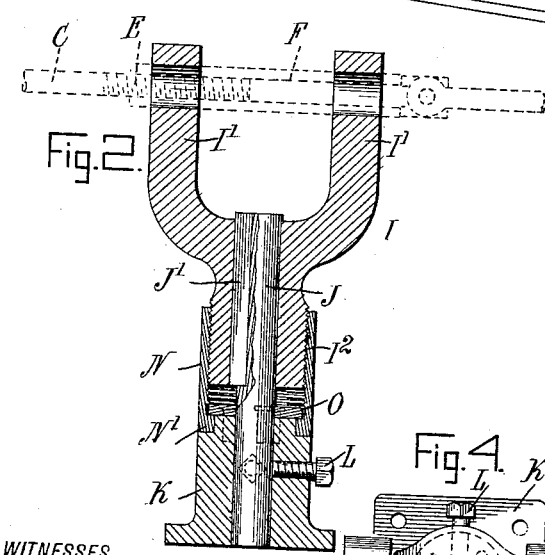
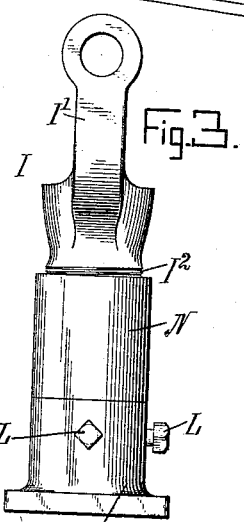
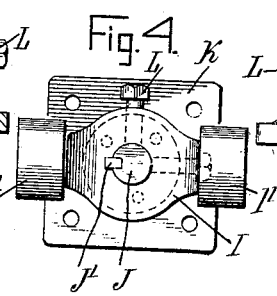
WITNESSES
INVENTOR
George E. Heselton
BY
ATTORNEYS

UNITED STATES PATENT OFFICE.

GEORGE E. HESELTON, OF PLATTSBURG, NEW YORK.

ADJUSTABLE BEARING.

1,058,304.    Specification of Letters Patent.    Patented Apr. 8, 1913.

Application filed November 17, 1911. Serial No. 660,870.

*To all whom it may concern:*

Be it known that I, GEORGE E. HESELTON, a citizen of the United States, and a resident of Plattsburg, in the county of Clinton and State of New York, have invented a new and Improved Adjustable Bearing, of which the following is a full, clear, and exact description.

The invention relates to anti-racing devices for governors of the Lombard type, and such as shown and described in the Letters Patent of the United States, No. 781,779 and No. 781,780, granted to N. Lombard on February 7, 1905.

The object of the present invention is to provide a new and improved bearing for an anti-racing device, arranged to prevent racing when shifting from a heavy load to a light load or vice versa.

For the purpose mentioned use is made of a base provided with a pin on which is mounted to slide a forked bearing by the use of a sleeve nut turning on the base and screwing on the forked bearing.

A practical embodiment of the invention is represented in the accompanying drawings forming a part of this specification, in which similar characters of reference indicate corresponding parts in all the views.

Figure 1 is a perspective view of a Lombard governor provided with an improved bearing for the anti-racing device; Fig. 2 is an enlarged sectional side elevation of the adjustable bearing; Fig. 3 is an end elevation of the same; and Fig. 4 is a plan view of the same.

The Lombard governor shown in Fig. 1 is provided with a disk A driven at a constant speed and in frictional contact with a disk B normally standing in the center of the disk A, as plainly indicated in Fig. 1, and the said driven disk B is secured on a shaft C provided at one end with a rack D and at the other end with a screw thread E screwing in a nut F connected by a link G with an operating lever H for imparting a sliding motion to the nut F in the direction of the length thereof. The parts so far described belong to the anti-racing device of the Lombard governor, and further description of the same or the other parts of the Lombard governor is not deemed necessary as the action thereof is well known. The nut F is mounted to slide in the forks I' of a bearing I held on a pin J provided with a key J' engaging a key-way on the bearing I. The lower end of the pin J is secured to a base K by the use of set screws L, and the said base K is attached to the frame of the governor, as plainly indicated in Fig. 1. On the upper end of the base K is mounted to turn the lower end N' of a sleeve nut N screwing on the exterior thread $I^2$ of the bearing I, and the said sleeve nut N is held against axial movement by a retaining disk O attached to the top of the base K and engaging a shoulder on the lower end N' of the sleeve nut N. It will be noticed that by the arrangement described the bearing I can be raised or lowered on turning the sleeve nut N so that the nut F moves correspondingly with the bearing I and likewise the shaft C so as to move the disk B with more or less force into contact with the driving disk A. It is understood that as long as the disk B is in its central position on the driving disk A it remains at a standstill, but when the disk B is shifted sidewise off the center of the disk A, say to the right or to the left, it is rotated by contact with the disk A and consequently the shaft C is screwed in or out in the nut F. Now by having the bearing I adjustable in a vertical direction as described, it is evident that the disk B can be held with the desired force in frictional contact with the disk A to insure proper turning of the disk B from the disk A for the purpose of preventing racing of the governor especially when shifting from a heavy load to a light load or vice versa.

Having thus described my invention, I claim as new and desire to secure by Letters Patent:

1. In a device of the class described, a base provided with a bore, a bearing having an externally threaded tubular stem, a nut mounted to turn on the base and projecting above the top of the same, the said nut engaging the threaded stem of the bearing to adjust the latter vertically, a pin held in the bore of said base and extending through the said stem of the bearing, and means for holding the bearing against turning on said pin.

2. In a device of the class described, a base having a bore, a pin in the bore of the base, and projecting above the top of the same, means for fastening the pin to the base, a sleeve nut mounted to turn on the upper end of said base and projecting above the same, a forked bearing mounted on the projecting end of said pin and held against turning thereon, the said bearing being provided with an external screw thread engaged by the said sleeve nut, and means for holding the sleeve nut against axial movement.

3. In a device of the class described, a base, a pin, screws for fastening the pin to the base, a key on the pin, a forked bearing having a screw threaded stem provided with a key-way engaging the said key, a sleeve nut mounted to turn on the said base and screwing on the said stem of the bearing, the said sleeve nut having a shoulder on its lower end, and a disk attached to the top of the base and engaging the shoulder on the lower end of the sleeve nut to hold the sleeve nut against axial movement.

4. An adjustable bearing comprising a base having a reduced upper end, a bearing member adjustable vertically relative to the base, but held against rotation, a nut mounted to turn on the base and screwing on the said bearing member to adjust the same, the said nut having an inwardly extending annular flange at its lower end engaging the reduced upper end of the base, and a disk secured to the top of the base and extending over the flange on said nut for holding the nut against axial movement.

In testimony whereof I have signed my name to this specification in the presence of two subscribing witnesses.

GEORGE E. HESELTON.

Witnesses:
 FRANK C. AGNEW,
 DAVID H. AGNEW.

---

Copies of this patent may be obtained for five cents each, by addressing the "Commissioner of Patents, Washington, D. C."